(12) United States Patent
Wilhide

(10) Patent No.: US 10,545,552 B2
(45) Date of Patent: Jan. 28, 2020

(54) HESM PARALLEL RESPONSE MODE

(71) Applicant: Hamilton Sundstrand Corporation, Charlotte, NC (US)

(72) Inventor: Matthew L. Wilhide, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 354 days.

(21) Appl. No.: 15/639,128

(22) Filed: Jun. 30, 2017

(65) Prior Publication Data

US 2019/0004580 A1    Jan. 3, 2019

(51) Int. Cl.
| | |
|---|---|
| *G06F 1/30* | (2006.01) |
| *G06F 1/3206* | (2019.01) |
| *H01M 16/00* | (2006.01) |
| *H02J 7/34* | (2006.01) |
| *B64D 41/00* | (2006.01) |

(52) U.S. Cl.
CPC ............ *G06F 1/305* (2013.01); *G06F 1/3206* (2013.01); *H01M 16/003* (2013.01); *H02J 7/34* (2013.01); *B64D 41/00* (2013.01); *B64D 2221/00* (2013.01)

(58) Field of Classification Search
CPC ....................................................... G06F 1/305
See application file for complete search history.

(56) References Cited

U.S. PATENT DOCUMENTS

| | | |
|---|---|---|
| 6,998,822 B2 | 2/2006 | Turner |
| 7,701,082 B2 | 4/2010 | Lazarovich |
| 7,830,686 B2 | 11/2010 | Zeng |
| 8,890,463 B2 | 11/2014 | Rozman |
| 8,981,727 B2 | 3/2015 | Kusch et al. |
| 9,013,066 B2 | 4/2015 | Kojori |
| 9,197,088 B2 | 11/2015 | Viellard |
| 9,230,748 B1 | 1/2016 | Semrau |
| 9,419,522 B1 | 8/2016 | Khaligh |
| 9,535,480 B2 | 1/2017 | Ye et al. |
| 2005/0052165 A1 | 3/2005 | Willner |
| 2007/0182362 A1 | 8/2007 | Trainor |
| 2009/0309416 A1 | 12/2009 | Bose |
| 2011/0011659 A1 | 1/2011 | Sailor |
| 2014/0339902 A1 | 11/2014 | Sepe, Jr. |

(Continued)

OTHER PUBLICATIONS

Wikipedia contributors. (Apr. 14, 2019). Slew rate. In Wikipedia, The Free Encyclopedia. Retrieved 20:52, Sep. 18, 2019, from https://en.wikipedia.org/w/index.php?title=Slew_rate&oldid=892432254 (Year: 2019).*

(Continued)

*Primary Examiner* — Daniel J Cavallari

(74) *Attorney, Agent, or Firm* — Snell & Wilmer, L.L.P.

(57) ABSTRACT

A hybrid energy storage module (HESM) may include a battery and an ultracapacitor each configured to receive the electrical energy, store the electrical energy, and discharge the electrical energy, a power bus in electronic communication with the battery and the ultracapacitor, and a controller coupled to the battery and the ultracapacitor and configured to control charging and discharging of the battery and of the ultracapacitor such that the ultracapacitor and the battery are simultaneously enabled in response to a power demand slew rate exceeding a power demand slew rate threshold.

20 Claims, 4 Drawing Sheets

(56) References Cited

U.S. PATENT DOCUMENTS

| | | |
|---|---|---|
| 2016/0082844 A1 | 3/2016 | King et al. |
| 2016/0204654 A1 | 7/2016 | Mondal |
| 2016/0214737 A1 | 7/2016 | Radun et al. |
| 2016/0265469 A1* | 9/2016 | Harada ................. F02D 41/20 |
| 2016/0378085 A1 | 12/2016 | Guo |
| 2017/0057363 A1 | 3/2017 | Huh |
| 2017/0063124 A1 | 3/2017 | Yu et al. |
| 2017/0077739 A1 | 3/2017 | Jouper |
| 2017/0155266 A1 | 6/2017 | Namou |
| 2017/0166081 A1 | 6/2017 | Kwon |

OTHER PUBLICATIONS

Wilhide, U.S. Appl. No. 15/230,181, filed Aug. 5, 2016 and entitled "Hybrid Energy Storage Module Arrangements".
Wilhide, U.S. Appl. No. 15/639,209, filed Jun. 30, 2017 and entitled "HESM Fast Recharge Algorithm".
Wilhide, U.S. Appl. No. 15/639,104, filed Jun. 30, 2017 and entitled "HESM High Pluse Power Algorithm".
Heglund, et al., U.S. Appl. No. 15/638,986, filed Jun. 30, 2017 and entitled "Hybrid Energy Storage Modules for Directed Energy Systems".
USPTO, Pre-Interview First Office Action dated Aug. 21, 2019 in U.S. Appl. No. 15/639,104.
USPTO, Non Office Action dated Sep. 26, 2019 in U.S. Appl. No. 15/638,986.
USPTO, First Action Interview Office Action dated Oct. 31, 2019 in U.S. Appl. No. 15/639,104.
USPTO, First Action Interview Office Action dated Nov. 15, 2019 in U.S. Appl. No. 15/639,209.

* cited by examiner

US 10,545,552 B2

HESM PARALLEL RESPONSE MODE

FIELD

The present disclosure is directed to power management systems for charging and discharging batteries and ultracapacitors of a hybrid energy storage module of an aircraft.

BACKGROUND

Many new components are being developed for use with aircraft. Some of these components may operate based on electrical energy. The electrical energy may be generated by a generator that converts mechanical power from an engine of the aircraft into electrical energy. The amplitude of the electrical energy required for some of these components may be relatively large. In that regard, it may be undesirable for the total electrical energy to be provided by the generator. This is because generation of the requisite electrical energy may undesirably affect performance of the engine.

SUMMARY

A hybrid energy storage module (HESM) configured to be used on an aircraft to provide electrical energy is disclosed herein, in accordance with various embodiments. The HESM may include a battery and an ultracapacitor each configured to receive the electrical energy, store the electrical energy, and discharge the electrical energy, wherein the ultracapacitor and the battery are connected in parallel with each other; a power bus in electronic communication with the battery and the ultracapacitor; and a controller coupled to the battery and the ultracapacitor and configured to control charging and discharging of the battery and of the ultracapacitor, such that the ultracapacitor and the battery are simultaneously enabled in response to a power demand slew rate exceeding a power demand slew rate threshold.

In various embodiments, the power demand slew rate threshold may comprise a power slew rate of the ultracapacitor. The controller may include a command trim, a voltage regulator, and an energy storage unit (ESU) current allocator. The HESM may further comprise a first converter coupled between the ultracapacitor and the power bus, and a second converter coupled between the battery and the power bus. The ESU current allocator may send a first converter command signal to the first converter and a second converter command signal to the second converter. The ESU current allocator may simultaneously send the first converter command signal to the first converter and the second converter command signal to the second converter in response to the power demand slew rate exceeding the power demand slew rate threshold. The HESM may further comprise a power filter, the power filter including a voltage sensor configured to sense a voltage signal of the power bus and a current sensor configured to sense a current signal through the power bus. The power demand slew rate may be calculated based upon the voltage sensor and the current sensor. The voltage regulator may receive the voltage signal from the voltage sensor and receives the current signal from the current sensor. The ultracapacitor and the battery may be connected in series with the power bus. The power filter may be coupled between the first converter and the power bus.

A power management system that is configured for use with an aircraft is disclosed herein, in accordance with various embodiments. The power management system may comprise a hybrid energy storage module (HESM) having a processor, and a tangible, non-transitory memory configured to communicate with the processor, the tangible, non-transitory memory having instructions stored thereon that, in response to execution by the processor, cause the HESM to perform operations comprising calculating, by the HESM, a power demand slew rate, determining, by the HESM, if the power demand slew rate exceeds a power demand slew rate threshold, and enabling, by the HESM, a battery and an ultracapacitor, simultaneously, in response to the power demand slew rate exceeding the power demand slew rate threshold.

In various embodiments, the instructions may cause the HESM to perform further operations comprising enabling, by the HESM, the ultracapacitor, in response to the power demand slew rate being less than the power demand slew rate threshold. The instructions may cause the HESM to perform further operations comprising determining, by the HESM, if a power demand increases beyond an ultracapacitor power limit, and enabling, by the HESM, the battery, in response to the power demand increasing beyond the ultracapacitor power limit. The power demand slew rate threshold may be equal to a maximum ultracapacitor power slew rate. The instructions may cause the HESM to perform further operations comprising sending, by the HESM, a first converter command signal to a first converter and a second converter command signal to a second converter in response to the power demand slew rate exceeding the power demand slew rate threshold.

A method for operating a hybrid energy storage module (HESM) is disclosed herein, in accordance with various embodiments. The method may comprise calculating, by the HESM, a power demand slew rate, determining, by the HESM, if the power demand slew rate exceeds a power demand slew rate threshold, and enabling, by the HESM, a battery and an ultracapacitor, simultaneously, in response to the power demand slew rate exceeding the power demand slew rate threshold.

In various embodiments, the method may further comprise enabling, by the HESM, the ultracapacitor, in response to the power demand slew rate being less than the power demand slew rate threshold. The method may further comprise determining, by the HESM, if the power demand increases beyond an ultracapacitor power limit, and enabling, by the HESM, the battery, in response to the power demand increasing beyond the ultracapacitor power limit. The power demand slew rate threshold may be equal to a maximum ultracapacitor power demand slew rate. The method may further comprise calculating, by the HESM, a power absorption slew rate, determining, by the HESM, if the power absorption slew rate exceeds a power absorption slew rate threshold, and enabling, by the HESM, the battery and the ultracapacitor, simultaneously, in response to the power absorption slew rate exceeding the power absorption slew rate threshold.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when con

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Typically, in response to a load demand, power is first drawn from an ultracapacitor. Then, a controller may determine whether or not to draw power from a battery, in addition to the ultracapacitor. This manner of operation may lead to decreased transient response.

A hybrid energy storage module (HESM) of the present disclosure may simultaneously draw power from a battery and an ultracapacitor in response to a power demand slew rate of a load demand being greater than a power demand slew rate threshold. In this manner, the transient response of the HESM may be increased.

Figure 1:
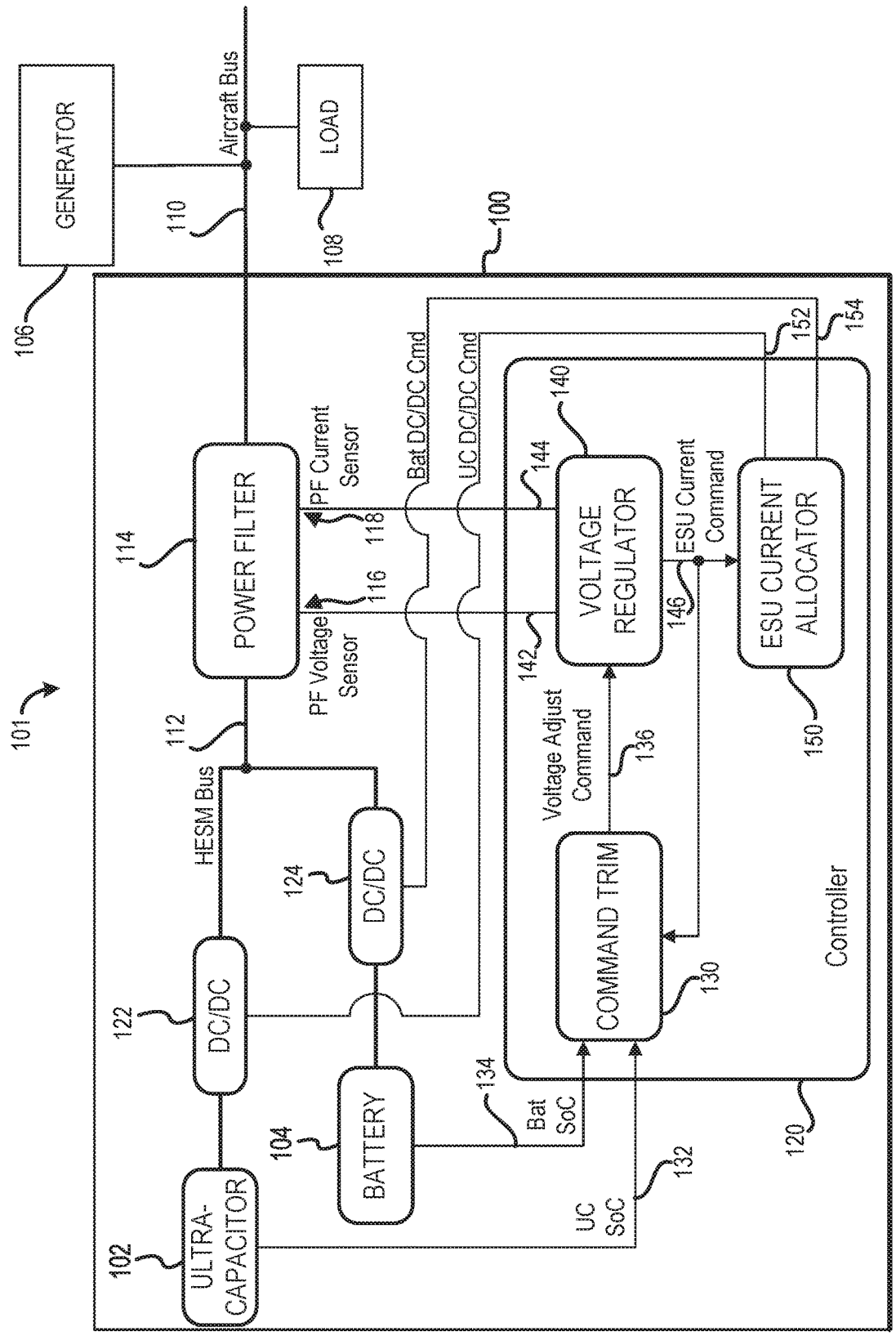
- FIG. 1 is a block diagram illustrating features of a power management system of an aircraft, in accordance with various embodiments of the present disclosure.

FIG. 1 illustrates a power management system 101 for use with an aircraft. The power management system 101 includes a HESM 100, a generator 106, and a load 108. The load 108 may include any load that operates using electrical energy, such as communication equipment, navigation equipment, directed energy systems, etc.

The generator 106 may be coupled to an engine of the aircraft, such as a gas turbine engine, and may convert mechanical power from the engine into electrical energy.

The HESM 100 may be designed to receive, store, and discharge electrical energy. In that regard, the HESM 100 includes an ultracapacitor 102, a battery 104, and a controller 120. The ultracapacitor 102 may also be referred to as a supercapacitor or an electric double-layer capacitor and may use one or both of electrostatic double-layer capacitance or electrochemical pseudocapacitance to store an electrical charge. A charge level of the ultracapacitor 102 may be referred to as an ultracapacitor state of charge (SOC). In various embodiments, the ultracapacitor 102 may store less charge than a battery and may store more charge than an electrolytic or other capacitor. The ultracapacitor 102 may be referred to herein as an energy storage unit (ESU).

The battery 104 may include any battery capable of storing an electrical charge. For example, the battery 104 may include a lithium-ion battery, a nickel cadmium battery, a nickel metal hydride battery, a lead acid battery, or the like. A charge level of the battery 104 may be referred to as a battery SOC. The battery 104 may be referred to herein as an ESU.

In response to the load 108 drawing electrical energy, the electrical energy may be provided simultaneously from the HESM 100 and from the generator 106. The load 108 may draw power in a series of pulses. For example, the load 108 may draw and utilize power for a first duration ("on" cycle), such as 8 seconds, may cease drawing the power for a second duration ("off" cycle), such as 2 seconds, may again draw the power for the first duration, and so forth. The first duration and the second duration may be determined based upon the design of load 108.

The ultracapacitor 102 may store less total electrical energy than the battery 104 and may also be capable of withstanding more charge/discharge cycles than the battery 104 without affecting performance of the ultracapacitor 102 over its lifetime. In that regard, it may be desirable for the ultracapacitor 102 to be recharged after each "on" cycle of the load 108 (i.e., during the "off" cycle), and it may be desirable for the battery 104 to be recharged after multiple cycles of the load 108.

In that regard, the controller 120 may control the charging and the discharging of the ultracapacitor 102 and the battery 104 such that the ultracapacitor 102 and the battery 104 discharge simultaneously to power the load 108, and the ultracapacitor 102 recharges prior to recharging of the battery 104.

The controller 120 may receive information from a power bus 110 that links the load 108, the generator 106, and the HESM 100. For example, the information may include a request for an amount of current, a request for an amount of voltage, a voltage on the power bus 110, or the like. Based on this information, the HESM 100 may generate an internal current command signal corresponding to an amount of current to be output by the HESM 100 or to an amount of current that will be provided to the HESM 100 to charge the ultracapacitor 102 and the battery 104. In this regard, ultracapacitor 102 and battery 104 may be coupled to a HESM bus 112. Ultracapacitor 102 and battery 104 may be coupled in parallel with each other. Ultracapacitor 102 and battery 103 may be coupled in series with HESM bus 112 and power bus 110.

Although depicted as a single ultracapacitor 102, it is contemplated herein that ultracapacitor 102 may comprise a plurality of ultracapacitors. The plurality of ultracapacitors may be connected in parallel. Although depicted as a single battery 104, it is contemplated herein that battery 104 may comprise a plurality of batteries. The plurality of batteries may be connected in parallel. In this regard, HESM 100 may comprise a plurality of channels corresponding to various ultracapacitors and/or batteries.

System 101 may comprise a power filter 114. Power filter 114 may be coupled between power bus 110 and HESM bus 112. Power filter 114 may be coupled in series between power bus 110 and HESM bus 112. In this regard, power filter 114 may be in electronic communication with power bus 110 and HESM bus 112. Power filter 114 may filter the power signal between the ESUs (i.e., ultracapacitor 102 and battery 104) and power bus 110. Power filter 114 may filter the power signal between generator 106 and HESM bus 112. Stated differently, power filter 114 may filter a power signal between HESM bus 112 and power bus 110. Power filter 114 may include a voltage sensor 116 and a current sensor 118. Voltage sensor 116 may measure an electrical voltage of power bus 110. Current sensor 118 may measure an electrical current through power bus 110. In this regard, controller 120 may receive a voltage signal 142 and a current signal 144 from power filter 114. Voltage signal 142 and current signal 144 may correspond to the voltage and the current of power bus 110, respectively. In various embodiments, the voltage of power bus 110 and HESM bus 112 may be substantially equal.

In various embodiments, system 101 may comprise a converter (also referred to herein as a first converter) 122. Converter 122 may be coupled between HESM bus 112 and ultracapacitor 102. Converter 122 may convert a relatively lower input voltage, from ultracapacitor 102 for example, to a relatively higher output voltage, to HESM bus 112 for example. Converter 122 may convert a relatively higher input voltage, from HESM bus 112 for example, to a relatively lower output voltage, to ultracapacitor 102 for example. System 101 may comprise a converter (also referred to herein as a second converter) 124. Converter 124 may be coupled between HESM bus 112 and battery 104. Converter 124 may convert a relatively lower input voltage, from battery 104 for example, to a relatively higher output voltage, to HESM bus 112 for example. Converter 124 may convert a relatively higher input voltage, from HESM bus 112 for example, to a relatively lower output voltage, to battery 104 for example. In this regard, the converters (i.e., converter 122 and converter 124) may step-up the voltage from the energy storage units to the HESM bus 112 and may step-down the voltage from HESM bus 112 to the energy storage units.

Although illustrated herein as comprising DC/DC converters, it is contemplated that converter 122 and converter 124 may comprise any type of converter suitable for load 108. Thus, in various embodiments, converter 122 and converter 124 may comprise DC/DC converters. In various embodiments, converter 122 and converter 124 may comprise DC/AC inverters.

The controller 120 may include various components or modules for controlling charge and discharge of the ultracapacitor 102 and the battery 104. Controller 120 may monitor the SOC of ultracapacitor 102 and the SOC of battery 104 and may command converter 122 and/or converter 124 to direct electrical energy into ultracapacitor 102 and/or battery 104 in response to the SOC of ultracapacitor 102 and/or battery 104 falling below a threshold value. Furthermore, in response to the SOC of ultracapacitor 102 and battery 104 being above the threshold value, controller may output a current command of zero (0) to converter 122 and converter 124 to prevent electrical energy from discharging from or being absorbed by ultracapacitor 102 and battery 104. Still further, in response to a load demand from power bus 110, controller 120 may command converter 122 and/or converter 124 to direct electrical energy from ultracapacitor 102 and/or battery 104 to power bus 110.

Controller 120 may include a command trim 130, a voltage regulator 140, and an ESU current allocator 150. Controller 120 may receive an ultracapacitor SOC signal 132 and a battery SOC signal 134. Ultracapacitor SOC signal 132 may indicate the amount of charge stored in ultracapacitor 102. Battery SOC signal 134 may indicate the amount of charge stored in battery 104. Command trim 130 may receive ultracapacitor SOC signal 132 and a battery SOC signal 134. Command trim 130 may receive a current command 146 from voltage regulator 140. Command trim 130 may send a voltage adjust command 136 based upon ultracapacitor SOC signal 132 and a battery SOC signal 134, and/or current command 146, as described with further detail herein. Voltage regulator 140 may receive voltage adjust command 136 and send current command 146 based upon voltage adjust command 136 and voltage signal 142. ESU current allocator 150 may receive current command 146 and send a converter command signal (also referred to herein as a first converter command signal) 152 and a converter command signal (also referred to herein as a second converter command signal) 154 to converter 122 and converter 124, respectively. Converter command signal 152 and converter command signal 154 may correspond to an amount of power to be received or sent by ultracapacitor 102 and battery 104, respectively.

In various embodiments, the natural state of controller 120 may be to output a current command (i.e., converter command signal 152 and a converter command signal 154) of zero (0) to converter 122 and converter 124. Stated differently, controller 120 may be configured to output a current command of zero (0) to converter 122 and converter 124 unless otherwise instructed in response to an external demand, such as a SOC of ultracapacitor 102 and/or battery 104 falling below a threshold value and/or a load demand from power bus 110. In various embodiments, controller 120 may drive the current command to zero (0) at a slower rate than the external demands. Thus, an external demand may override the natural state of the controller.

Figure 2:
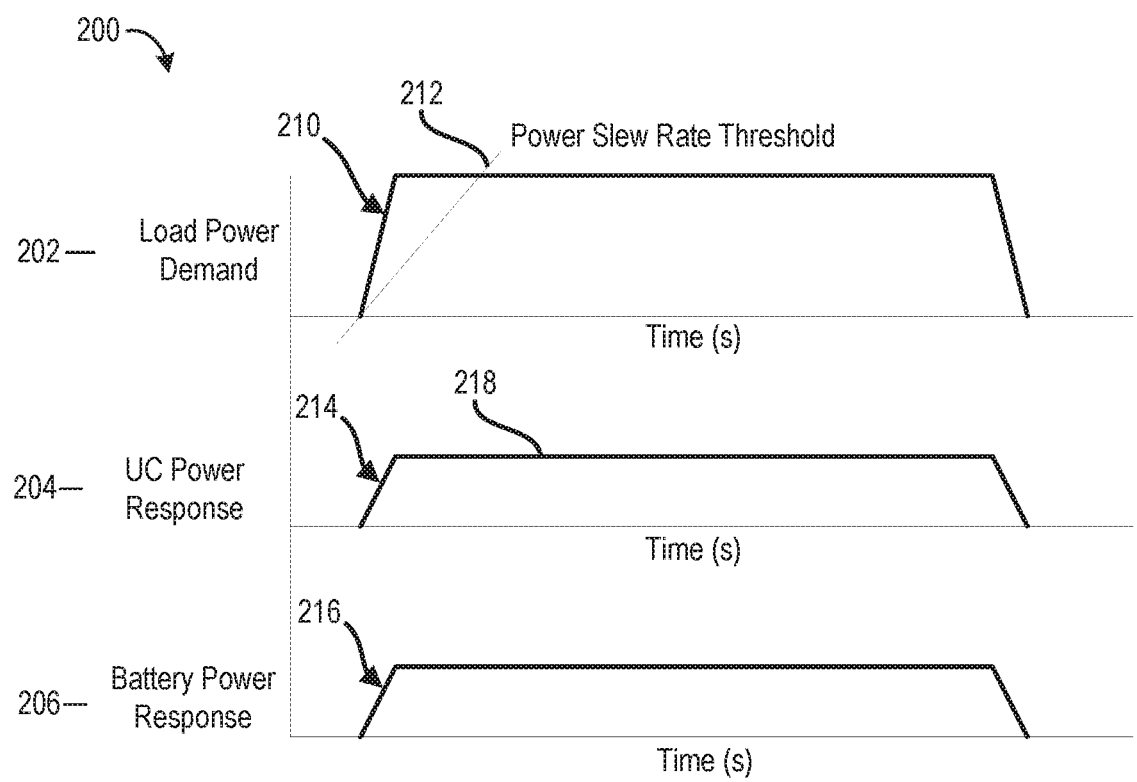
FIG. 2 is a graph illustrating power distribution of the power management system of FIG. 1 in parallel response mode, in accordance with various embodiments of the present disclosure.

With reference to FIG. 2, a chart 200 illustrates exemplary operation of the system 101. With combined reference to FIG. 1 and FIG. 2, load 108 may demand power from HESM 100, as depicted by load power demand 202. The load power demand 202 may comprise the power of power bus 110. Power may be the voltage of power bus 110 multiplied by the current through power bus 110. In this regard, HESM 100 may detect the power of power bus 110 via voltage sensor 116 and current sensor 118. HESM 100 may determine a power demand slew rate 210 of load power demand 202. The power demand slew rate 210 may be the slope of load power demand 202. HESM 100 may determine if the power demand slew rate 210 is greater than a power demand slew rate threshold 212. FIG. 2 illustrates power demand slew rate 210 being greater than power demand slew rate threshold 212. The power demand slew rate threshold 212 may be any suitable power demand slew rate threshold which may indicate to HESM 100 to simultaneously draw power from both ultracapacitor 102 and battery 104. In this regard, HESM 100 may simultaneously activate ultracapacitor 102 and battery 104 in response to power demand slew rate 210 being greater than power demand slew rate threshold 212. In this regard, the power demand slew rate 210 may be equal to or greater than the power slew rate 214 of ultracapacitor response 204 and the power slew rate 216 of battery response 206. For example, if the power bus 110 receives power from the generator 106, in addition to ultracapacitor 102 and battery 104, then power demand slew rate 210 may be greater than the sum of power slew rate 214 and power slew rate 216. The transient response of HESM 100 may be increased in response to simultaneous activation of ultracapacitor 102 and battery 104. Stated differently, the rate of response (e.g., the power slew rate) of HESM 100 may be increased in response to simultaneous activation of ultracapacitor 102 and battery 104. In various embodiments, HESM 100 may be capable of supporting power demand slew rates of several hundred kilowatts per millisecond (kW/ms) or more. In various embodiments, ultracapacitor power slew rate 214 may be the maximum power slew rate of ultracapacitor 102.

Referring to FIG. 1, each component or function of the controller 120 may be implemented using hardware or software. For example, the controller 120 may include a central processing unit (CPU), an accelerated processing unit (APU), a digital signal processor (DSP), a field programmable gate array (FPGA), an application specific integrated circuit (ASIC) or the like, and each component or function may be performed using software. In various embodiments, each component or function of the controller 120 may be performed by one or more separate piece of hardware. In various embodiments, multiple components or functions may be performed by a single piece of hardware.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
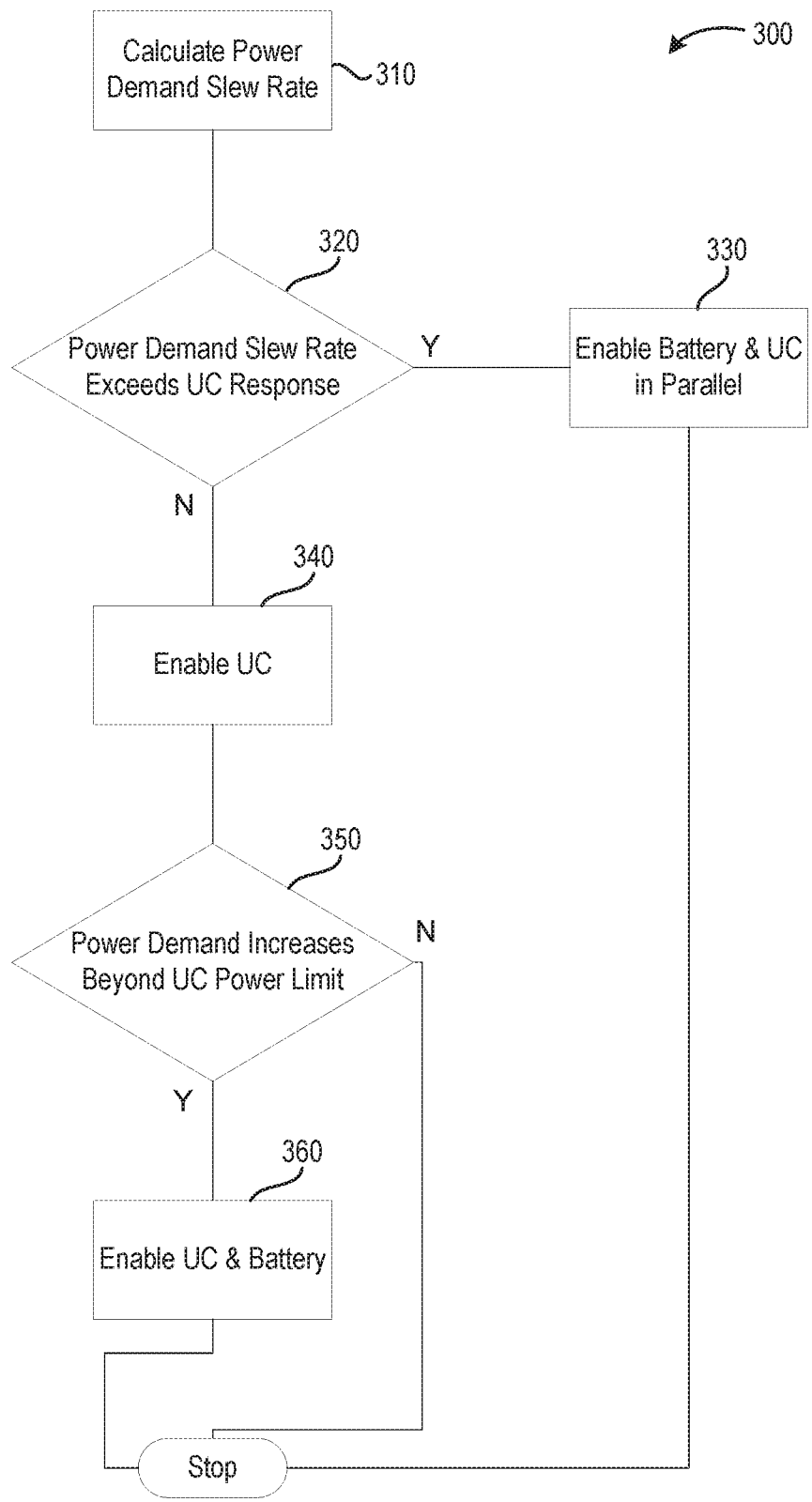
FIG. 3 is a method for operating a hybrid energy storage module (HESM), in accordance with various embodiments of the present disclosure.

With reference to FIG. 3, a method 300 for operating a HESM is illustrated, in accordance with various embodiments. Method 300 includes calculating power demand slew rate (step 310). Method 300 includes determining if the power demand slew rate exceeds the ultracapacitor response (step 320). Method 300 includes simultaneously enabling the battery and the ultracapacitor in parallel, in response to the power demand slew rate exceeding the ultracapacitor response (step 330). Method 300 includes enabling the ultracapacitor, in response to the power demand slew rate not exceeding the ultracapacitor response (step 340). Method 300 includes determining if the power demand increases beyond the ultracapacitor power limit (step 350). Method 300 includes enabling the battery, in addition to the ultracapacitor, in response to the power demand increasing beyond the ultracapacitor power limit (step 360).

With combined reference to FIG. 1, FIG. 2, and FIG. 3, step 310 may include calculating power demand slew rate 210. Power demand slew rate may be calculated by HESM 100 using voltage sensor 116 and current sensor 118. Step 320 may include determining if the power demand slew rate 210 exceeds the power demand slew rate threshold 212. In various embodiments, the power demand slew rate threshold 212 may be equal to the ultracapacitor response. In this regard, step 320 may include determining if the power demand slew rate 210 exceeds the ultracapacitor power slew rate 214. Step 330 may include simultaneously enabling battery 104 and ultracapacitor 102 in parallel, in response to at least one of the power demand slew rate 210 exceeding the ultracapacitor power slew rate 214 or the power demand slew rate 210 exceeding the power demand slew rate threshold 212. Step 330 may include simultaneously sending, by ESU current allocator, converter command signal 152 and a converter command signal 154 to converter 122 and converter 124, respectively. Step 340 may include enabling ultracapacitor 102. Step 340 may be performed in response to power demand slew rate 210 not exceeding the ultracapacitor power slew rate 214. Step 340 may be performed in response to power demand slew rate 210 not exceeding power demand slew rate threshold 212. Step 350 may include determining of the load power demand 202 increases beyond the ultracapacitor power limit 218. Method 300 may include enabling battery 104 in addition to ultracapacitor 102 in response to load power demand 202 increasing beyond the ultracapacitor power limit 218.

It is contemplated herein that instead of calculating power demand slew rate, method 300 may be suitable for calculating power absorption slew rate. In this regard, step 310 may include calculating power absorption slew rate. Power absorption slew rate may be the slew rate of power being absorbed by HESM 100 from power bus 110. In this regard, ultracapacitor 102 and battery 104 may be activated simultaneously in response to the slew rate of power being absorbed by HESM 100 being greater than a power absorption slew rate threshold.

Figure 4:
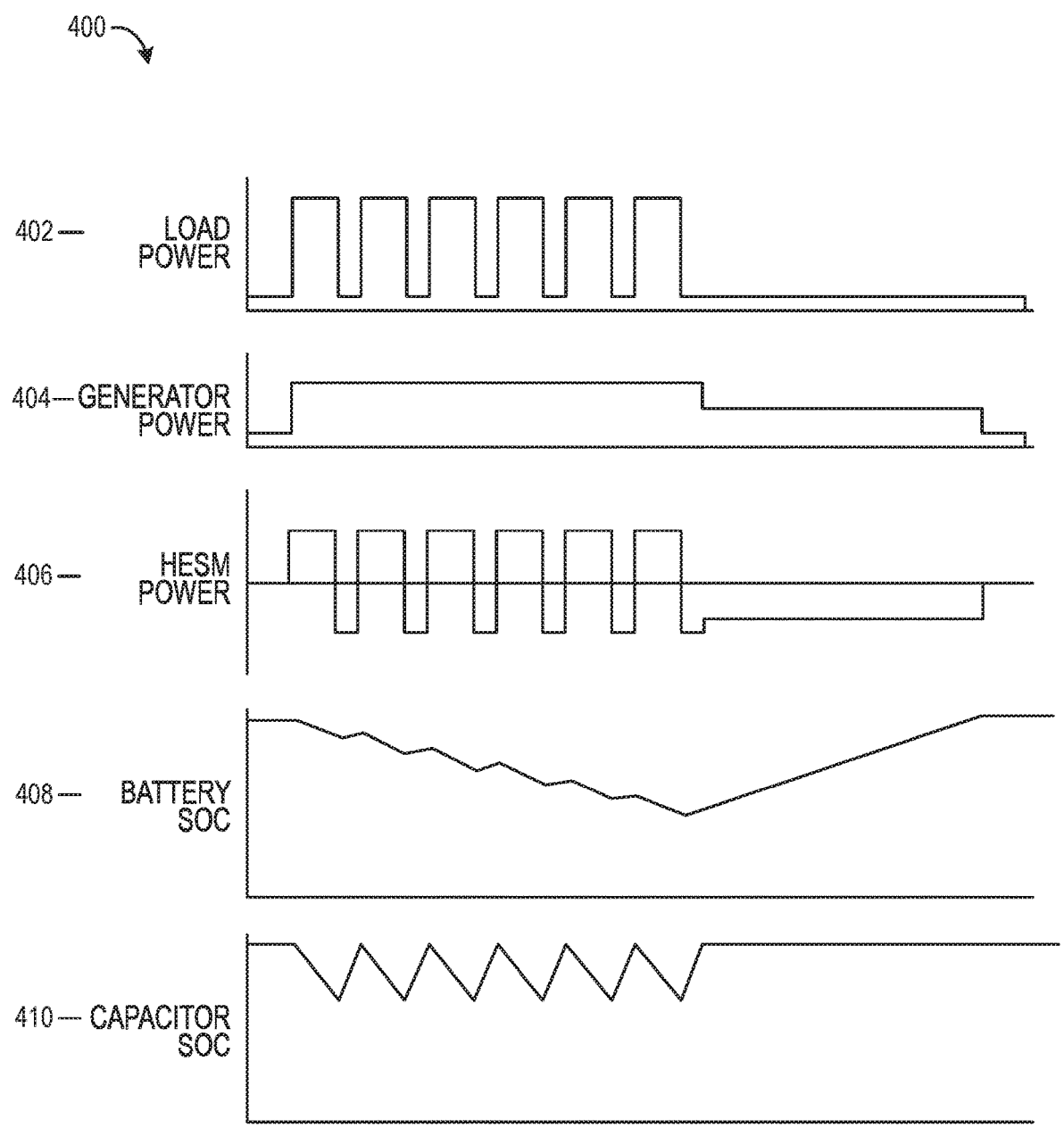
FIG. 4 is a graph illustrating power distribution of the power management system of FIG. 1, in accordance with various embodiments of the present disclosure.

Referring to FIGS. 1 and 4, a chart 400 illustrates exemplary operation of the system 101. The load power 402 may correspond to power usage by the load 108. As shown, the load power 402 includes a series of pulses which may correspond to an "on" cycle during which the load 108 uses power, and an "off" cycle during which the load 108 uses substantially no power.

As the power is initially requested for the load 108, the HESM 100 may begin to output electrical energy, as shown by HESM power 406. Simultaneously, the generator 106 may begin to output electrical energy, as shown by the generator power 404. In response to the load 108 receiving power, the electrical energy generated by both of the HESM 100 and by the generator 106 may be provided to the load 108. In particular, electrical energy may be discharged from the ultracapacitor 102 and from the battery 104, as shown in the capacitor SOC 410 and the battery SOC 408, respectively.

As the load power 402 reaches the "off" cycle, the generator 106 may continue to generate power. Because the ultracapacitor 102 has less energy storage capacity than the battery 104, the SOC of the ultracapacitor 102 may be lower than the SOC of the battery 104. Accordingly, a majority of the energy generated by the generator 106 may be provided to the ultracapacitor 102 to recharge the ultracapacitor 102. The battery 104 may not receive any electrical energy, or may receive minimal electrical energy, until the ultracapacitor 102 is charged to the desired ultracapacitor SOC, which may not happen during the load power series.

As the load power reaches another "on" cycle, power may again be provided to the load 108 from a combination of the generator 106, the ultracapacitor 102, and the battery 104. Because the battery 104 may receive minimal charge during the "off" cycle, the battery SOC 408 may continue to reduce during each "on" cycle without being recharged to a previous SOC. This charging structure may be desirable as the battery 104 may become damaged in response to fewer charge/discharge cycles than the ultracapacitor 102.

After the load power series is complete, the generator 106 may continue to generate energy to recharge the ultracapacitor 102 and the battery 104. As shown, the capacitor SOC 410 is charged to the desired ultracapacitor SOC prior to energy being provided to the battery 104 to charge the battery 104. In response to the capacitor SOC 410 reaching the desired ultracapacitor SOC, the energy generated by the generator 106 may be provided to the battery 104 to increase the battery SOC 408 to a desired battery SOC. In response to the battery SOC 408 reaching the desired battery SOC, the generator 106 may stop outputting energy, or may output a reduced energy level.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid energy storage module (HESM) configured to be used on an aircraft to provide electrical energy, the HESM comprising:
    a battery and an ultracapacitor each configured to receive the electrical energy, store the electrical energy, and discharge the electrical energy, wherein the ultracapacitor and the battery are connected in parallel with each other;
    a power bus in electronic communication with the battery and the ultracapacitor; and
    a controller coupled to the battery and the ultracapacitor and configured to control charging and discharging of the battery and of the ultracapacitor such that the ultracapacitor and the battery are simultaneously enabled in response to a power demand slew rate exceeding a power demand slew rate threshold.

2. The HESM of claim 1, wherein the power demand slew rate threshold comprises a power slew rate of the ultracapacitor.

3. The HESM of claim 1, wherein the controller includes:
    a command trim;
    a voltage regulator; and
    an energy storage unit (ESU) current allocator.

4. The HESM of claim 3, further comprising:
    a first converter coupled between the ultracapacitor and the power bus; and
    a second converter coupled between the battery and the power bus.

5. The HESM of claim 4, wherein the ESU current allocator sends a first converter command signal to the first converter and a second converter command signal to the second converter.

6. The HESM of claim 5, wherein the ESU current allocator simultaneously sends the first converter command signal to the first converter and the second converter command signal to the second converter in response to the power demand slew rate exceeding the power demand slew rate threshold.

7. The HESM of claim 6, further comprising a power filter, the power filter including a voltage sensor configured to sense a voltage signal of the power bus and a current sensor configured to sense a current signal through the power bus.

8. The HESM of claim 7, wherein the power demand slew rate is calculated via the voltage sensor and the current sensor.

9. The HESM of claim 8, wherein the voltage regulator receives the voltage signal from the voltage sensor and receives the current signal from the current sensor.

10. The HESM of claim 9, wherein the ultracapacitor and the battery are each connected in series with the power bus.

11. The HESM of claim 10, wherein the power filter is coupled between the first converter and the power bus.

12. A power management system that is configured for use with an aircraft, comprising:
    a hybrid energy storage module (HESM) having a processor; and
    a tangible, non-transitory memory configured to communicate with the processor, the tangible, non-transitory memory having instructions stored thereon that, in response to execution by the processor, cause the HESM to perform operations comprising:
        calculating, by the HESM, a power demand slew rate;
        determining, by the HESM, if the power demand slew rate exceeds a power demand slew rate threshold; and
        enabling, by the HESM, a battery and an ultracapacitor, simultaneously, in response to the power demand slew rate exceeding the power demand slew rate threshold.

13. The power management system of claim 12, wherein the instructions cause the HESM to perform further operations comprising:
   enabling, by the HESM, the ultracapacitor, in response to the power demand slew rate being less than the power demand slew rate threshold.

14. The power management system of claim 13, wherein the instructions cause the HESM to perform further operations comprising:
   determining, by the HESM, if a power demand increases beyond an ultracapacitor power limit; and
   enabling, by the HESM, the battery, in response to the power demand increasing beyond the ultracapacitor power limit.

15. The power management system of claim 12, wherein the power demand slew rate threshold is equal to a maximum ultracapacitor power slew rate.

16. The power management system of claim 12, wherein the instructions cause the HESM to perform further operations comprising:
   sending, by the HESM, a first converter command signal to a first converter and a second converter command signal to a second converter in response to the power demand slew rate exceeding the power demand slew rate threshold.

17. A method for operating a hybrid energy storage module (HESM), comprising:
   calculating, by the HESM, a power demand slew rate;
   determining, by the HESM, if the power demand slew rate exceeds a power demand slew rate threshold; and
   enabling, by the HESM, a battery and an ultracapacitor, simultaneously, in response to the power demand slew rate exceeding the power demand slew rate threshold.

18. The method of claim 17, further comprising:
   enabling, by the HESM, the ultracapacitor, in response to the power demand slew rate being less than the power demand slew rate threshold.

19. The method of claim 18, further comprising:
   determining, by the HESM, if a power demand increases beyond an ultracapacitor power limit; and
   enabling, by the HESM, the battery, in response to the power demand increasing beyond the ultracapacitor power limit.

20. The method of claim 17, further comprising:
   calculating, by the HESM, a power absorption slew rate;
   determining, by the HESM, if the power absorption slew rate exceeds a power absorption slew rate threshold; and
   enabling, by the HESM, the battery and the ultracapacitor, simultaneously, in response to the power absorption slew rate exceeding the power absorption slew rate threshold.

* * * * *